W. A. FARMER.
RAILROAD CROSSING SIGNAL.
APPLICATION FILED NOV. 22, 1916.
1,287,933.
Patented Dec. 17, 1918.
2 SHEETS—SHEET 1.
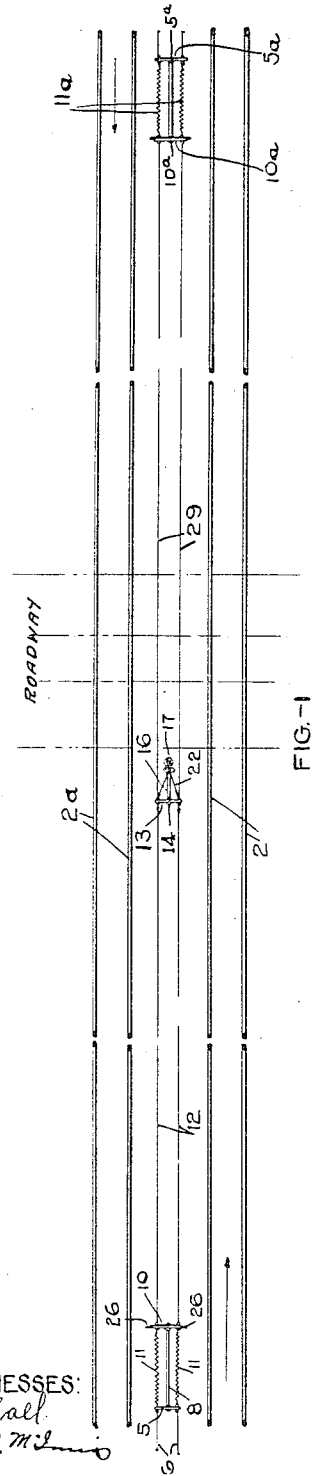
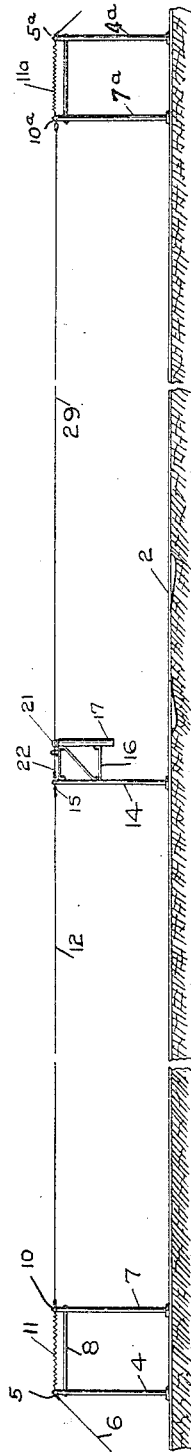
WITNESSES:
B. Hall
M. R. McInnis
INVENTOR
WILLIAM A. FARMER
BY
Paul & Paul
ATTORNEYS

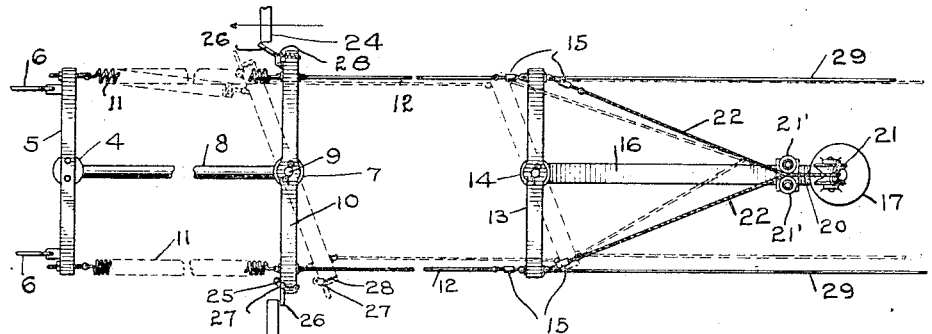
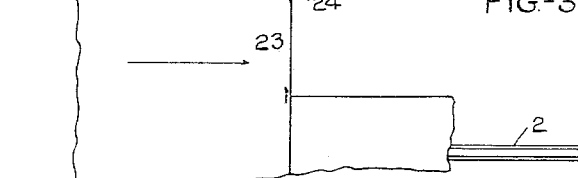
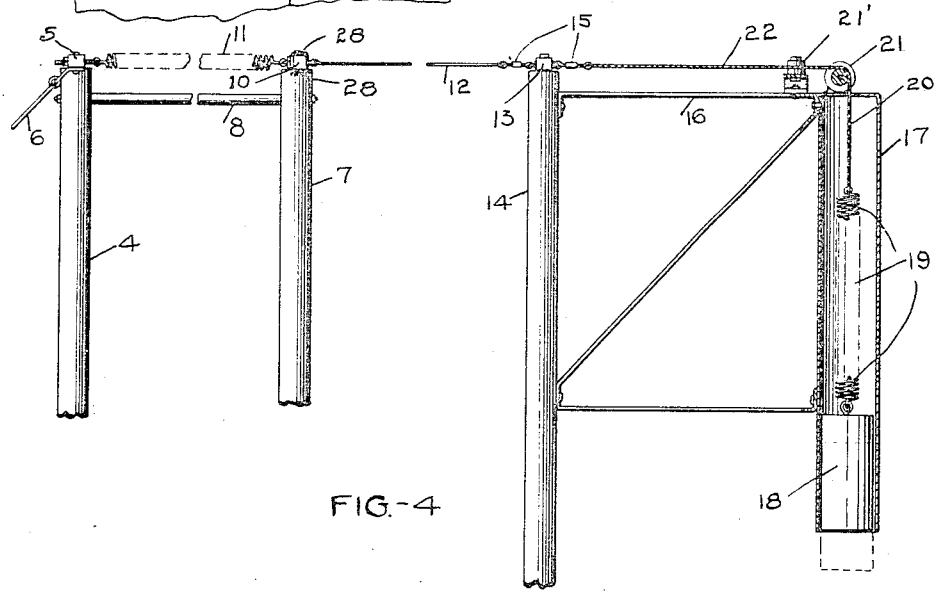

UNITED STATES PATENT OFFICE.

WILLIAM A. FARMER, OF PARK RAPIDS, MINNESOTA.

RAILROAD-CROSSING SIGNAL.

1,287,933.     Specification of Letters Patent.     Patented Dec. 17, 1918.

Application filed November 22, 1916. Serial No. 132,828.

*To all whom it may concern:*

Be it known that I, WILLIAM A. FARMER, a citizen of the United States, resident of Park Rapids, county of Hubbard, State of Minnesota, have invented certain new and useful Improvements in Railroad-Crossing Signals, of which the following is a specification.

Railroad grade crossings, always dangerous for vehicles and pedestrians, have become particularly so since the extensive use of automobiles, for the reason that a car approaching a crossing where the track is hidden by bushes or an embankment is often on or so near the track that collision with a rapidly approaching train is unavoidable. This is due partly to the obstructed vision of the driver of the car, to the noise of his own engine and sometimes to the wind, which may be blowing in a direction to carry the sound of the approaching train away from the driver of the car. Many fatal accidents have resulted from the inability of a car driver to hear or see a train approaching a grade crossing.

The object of my invention, therefore, is to provide a positively acting, reliable apparatus by means of which the driver of an automobile or other vehicle will be instantly warned when a train has approached from either direction within a predetermined distance of the crossing.

A further object is to provide an apparatus of comparatively simple construction and one which cannot easily get out of order and will be operative under all climatic conditions.

The invention consists generally in various constructions and combinations, all as hereinafter described and particularly pointed out in the claims.

In the accompanying drawings forming part of this specification,

Figure 1 is a plan view of a section of a railroad track with my invention applied thereto, Fig. 2 is a side view of the same, Fig. 3 is a plan view showing a portion of the cab of a locomotive, with a device mounted thereon for actuating the signal, Fig. 4 is a detail view, showing the preferred manner of mounting the signaling device on its support.

In the drawing, 2 and 2ª represent the right and left hand tracks of a double track system of railroad. Between these tracks I erect a standard 4 having mounted thereon a cross bar 5, preferably provided at each end with bracing or guy rods 6. 7 represents a similar standard, spaced a suitable distance from the standard 4 and preferably connected therewith by a bar 8. Pivoted at 9 on the standard 7 is an oscillating bar 10 having freedom of oscillation in a horizontal plane on its central pivot. The ends of this bar 10 are connected by extension springs 11 with the corresponding ends of the cross bar 5, suitable devices at the ends being provided for increasing the tension of the springs or taking up the slack therein. These springs are extended when the signal device is operated by an approaching train and yield sufficiently to take up the shock or jar arising from the contact of the train with the signal and also have the function of returning the signal mechanism to its normal position after the passage of a train. The springs are made of suitable length and gage of wire and coil, as may seem advisable for the successful operation of the signal device.

Cables 12 are connected at one end to the bar 10 and are attached to the ends of a similar bar 13 that is mounted on an upright standard 14 adjacent to the grade crossing. Suitable turn buckles 15 are provided for taking up the slack in the cables. A bracket 16 is mounted on the standard 14 and carries a vertically arranged tube 17 in which a weight 18 is slidable. A coil spring 19 connects this weight with a cable 20 which passes over a pulley 21 and between sheaves 21' and is connected to a cable 22 that is attached to the ends of the bar 13. The spring 19 normally holds the weight 18 within the tube 17 so that it is preferably concealed when not in operation. When, however, this spring is suddenly twitched or jerked through a quick pull on the cable 20, the weight 18 will begin to slide up and down in the tube 17, dropping to a point below the open end of the tube, where the weight will be visible to a person approaching the crossing who will be warned by the agitation of this weight that a train is rapidly approaching the crossing.

To operate the signal, I provide the cab 23 of a locomotive with an outwardly projecting arm 23 and upon the ends of the bar 10 I pivot at 25 a latch 26 having a lug 27 that is held against the end of the bar by a spring 28. This latch normally lies in the path of the arm 24 a suitable distance from the ground to prevent damage by any mischievous person and also a sufficient distance to be clear of any heavy snow fall. This bar 10 will be located say three hundred yards from the highway crossing and when the bar is oscillated by contact with the arm 24, its movement will be transmitted to the bar 13 and from thence to the weight 18 to set it in motion up and down within the pipe 17 and within the range of vision of the driver of the vehicle approaching the crossing, who will be instantly warned that a train is in proximity to the crossing.

The device is duplicated on the other side of the crossing, so that trains approaching from the other direction will warn the drivers of vehicles and to accomplish this I provide cables 29 connecting the cross bar 13 with a bar corresponding to the bar 10 and which I will indicate by the same reference numeral, with the addition of the exponent "a," located on the opposite side of the highway and having coiled springs and a fixed cross bar corresponding to those previously described and which I will designate by numerals 11$^a$ and 5$^a$. Both of the cross bars 10 and 10$^a$ are equipped with the pivoted latch device arranged so that the cross bar will be oscillated when a train approaches the crossing from either direction, but will swing on its pivot without operating the cross bar when a train is leaving the crossing and when, of course, there is no advantage in having the visual signal operated.

I claim as my invention:

1. The combination, with a railroad track, of a guide vertically arranged near the grade crossing, a weight suspended within said guide and freely movable vertically therein and normally concealed by said guide, and mechanism actuated by a train approaching the crossing from either direction for dropping said weight through the open lower end of said guide and agitating it within view of a person approaching the crossing.

2. The combination, with a railroad track, of a pipe vertically arranged near a grade crossing, a weight suspended within said pipe and freely movable vertically therein, and mechanism actuated by a train approaching the crossing for dropping said weight through the open lower end of said pipe and agitating it within view of a person approaching the crossing.

3. The combination, with a railroad track, of a signaling device comprising an upright standard, a cross bar rigidly mounted thereon, a second standard, a cross bar centrally pivoted thereon, springs yieldingly connecting said oscillating bar with said rigid bar, a third standard and oscillating bar mounted thereon, a visual signal device connected with said second oscillating bar, cables connecting said oscillating bars with one another, said first named bar having means actuated by an approaching train for oscillating it and agitating said signal.

4. A railroad signaling device comprising an upright hollow member, a weight vertically slidable therein and normally concealed, an extension spring connected with said weight, a cable attached to said spring, mechanism actuated by an approaching train for putting said cable under tension to extend said spring and agitate said weight below the open lower end of said member, for the purpose specified.

5. A railroad signaling device comprising a standard having a cross bar mounted thereon, a second standard, an oscillating cross bar carried thereby, coiled springs connecting the corresponding ends of said cross bars, a latch device mounted on said oscillating cross bar to be struck by a passing train for oscillating said bar and putting one of said springs under tension, a visual signal device, means connecting said oscillating bar with said signal device for operating said signal device when said bar is oscillated, said coiled springs returning said oscillating bar and said signal device to their normal position after the passage of the train.

6. The combination, with a railroad track, of a signaling device comprising an upright standard having a cross bar thereon, a second standard, a pivoted bar thereon, springs yieldingly connecting said bars, a third standard and oscillating bar, a visual signaling device connected with said last named bar, cables connecting said oscillating bars and one of said bars having means actuated by an approaching train for operating it and agitating said signal.

In witness whereof, I have hereunto set my hand this 17" day of November 1916.

WILLIAM A. FARMER.

Copies of this patent may be obtained for five cents each, by addressing the "Commissioner of Patents, Washington, D. C."